Dec. 9, 1952     S. S. CARLISLE ET AL     2,620,665
SENSITIVE MANOMETER

Filed June 2, 1949     2 SHEETS—SHEET 1

Inventors:
Samuel Skipton Carlisle and
Bernard Owen Smith,
By: Pierce, Scheffler & Parker,
Attorneys.

Inventors:
Samuel Skipton Carlisle and
Bernard Owen Smith,
By Pierce, Scheffler & Parker,
Attorneys.

Patented Dec. 9, 1952

2,620,665

UNITED STATES PATENT OFFICE 2,620,665

SENSITIVE MANOMETER

Samuel Skipton Carlisle and Bernard Owen Smith, London, England, assignors to The British Iron and Steel Research Association, London, England, a British company Application June 2, 1949, Serial No. 96,752
In Great Britain March 19, 1948

10 Claims. (Cl. 73—398)

This invention relates to instruments for measuring an applied mechanical force. While the invention is not confined to any particular class of such instrument it will be hereinafter described as applied to a sensitive differential pressure measuring instrument or manometers. This instrument is capable of measuring and remotely indicating differential gaseous pressures of the order of hundredths of an inch water gauge. The instrument has been developed for use in measuring the pressure above or below atmospheric within an open hearth steel-making furnace, but it may be employed for many other purposes also. For example it may be used to measure the difference of pressure in a gas conduit on opposite sides of an orifice plate and thereby afford a measurement of the rate of flow of gas through the conduit.

An instrument in accordance with the invention comprises essentially a rod mounted for free axial movement, means for producing a magnetic field, an electric restoring coil mounted on the rod and moving in the magnetic field, means for applying to the rod so as to produce axial displacement thereof the force to be measured, means responsive to the displacement of the rod for producing an electric current of a strength increasing with the degree of displacement, means for applying said current to said restoring coil whereby to produce a mechanical force balancing said applied force and means for measuring said current. The nature of the invention will otherwise sufficiently appear from the appended claims when read in the light of the following description of the particular embodiments of the invention illustrated in the accompanying drawings.

In these drawings.

Figure 1:
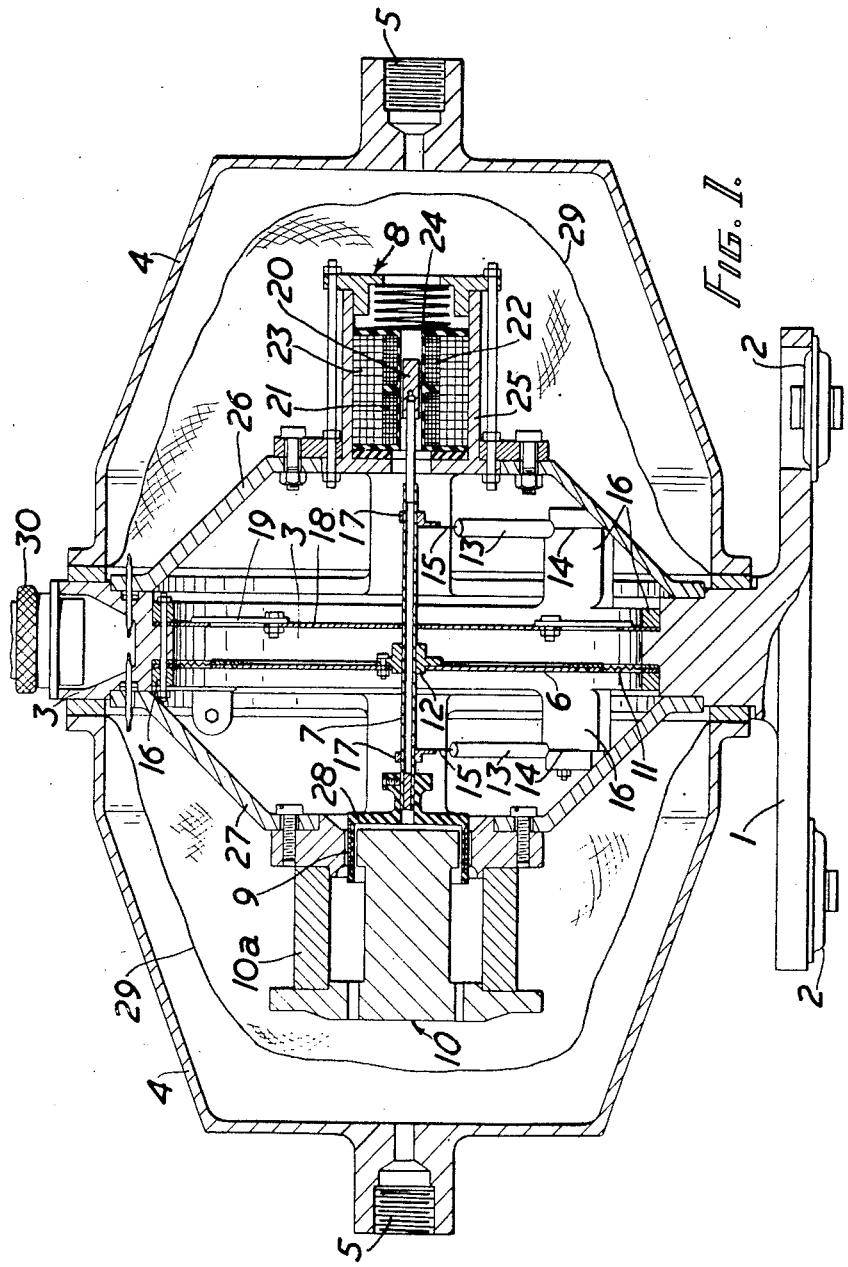
Figure 1 is an axial section through the head unit of the instrument.

Referring first to Figure 1, the head unit comprises a base 1 provided with shock absorbing mountings 2 and supporting a vertical ring 3. Secured on opposite sides of this ring are two half casings 4, formed with central apertures 5, adapted for connection respectively to the points whose pressure difference is to be measured. Across the gas tight enclosure formed by the casings 4 there extends a vertically disposed rigid diaphragm 6 carried upon a horizontally disposed axial rod 7, the diaphragm and axis rod being mounted (in a manner described below) for free axial movement.

For the purposes of the invention the diaphragm and its axis rod may be regarded as freely mounted if the mechanical restraint to their movement in an axial direction is negligible by comparison with the force developed by the application of the differential pressures to be measured to the opposite sides of the diaphragm. With the present design of instrument a diaphragm displacement of about 1 mm. occurs under the application of the maximum differential pressure of 0.1 inch w. g. (35 grams force on the diaphragm), while the freedom of the diaphragm is such that the mechanical restraint introduced for a displacement of 1 mm. is not more than about 0.4 gram.

Taking into account this mechanical restraint and the small reaction force developed by the detector (discussed later) the total restraining force on the diaphragm due to these sources is less than 1/30th part of the restraint produced by the moving coil. The effective percentage "feed back" in the measuring system is thus of the order of 97%. This results in a high stability of calibration of the instrument and makes it effectively independent of normal variations in amplifier gain and variations in spring strength of the mechanical restraint such as might arise in the suspension system. It is also clear that with this order of percentage feed back no appreciable drift in the zero reading of the instrument is to be expected with normal distortions of the frame such as might tend to move the detector assembly relative to the diaphragm system.

At one end of the axis rod is an electrical detector unit designated in general as 8, the signal from which is applied to an electronic amplifier to produce an electric current whose direction and strength are dependent upon the direction and degree of displacement of the diaphragm. This current is applied to a coil 9 mounted on the opposite end of the axis rod and moving in the field of a strong permanent magnet 10, the arrangement being such that the restoring force on the diaphragm developed by the moving coil is accurately proportional to the current through the coil.

The application of a differential pressure to the apertures 5 and thus to the diaphragm causes a displacement of the axis rod, which results in sufficient current being supplied to the moving coil for the latter to produce a balancing force equal to that arising from the differential pressure on the diaphragm. Provided that the above mentioned requirements are fulfilled, the current in the moving coil when this equilibrium condition is attained is directly proportional to the differential pressure to be measured, so that a measurement of this current made by any suitable instrument located at any required position affords the desired indication.

The diaphragm 6 consists of a thin rigid disc of the material known as paxolin and measures five inches in diameter. The annular space between the outer edge of the diaphragm and the central mounting ring 3 is sealed off by an annulus 11 of goldbeater's skin. At its centre the diaphragm carries a boss 12 which is secured upon the tubular aluminum axis rod 7. This rod is supported upon the upper ends of four pillars, disposed two on each side of the diaphragm, the pillars of each pair being set at right angles to one another in the form of an inverted V. Each pillar comprises a length of stiff aluminum rod 13, secured between and in alignment with two short lengths 14, 15 of flexible beryllium-copper strip. The lower strips 14 are secured to stationary rings 16, clamped to the central ring 3, while the upper strips 15 are secured to collars 17 secured on the axis rod 7. Owing to their construction the pillars have a considerable rigidity along their length and thus accurately position the centre axis of the diaphragm, but they have a high degree of flexibility to bending, thus allowing free motion of the diaphragm in an axial direction. A damping plate 18, consisting of a circular disc of brass with a central hole through which the axis rod 7 passes freely, is secured to the central ring 3 on one side of the diaphragm, so as to provide air damping on the motion of the diaphragm. The degree of damping can be adjusted by adjusting or removing caps 19 covering openings in the damping disc. In the construction of the diaphragm and its support care is taken to keep the inertia of the moving parts as low as possible, in order to reduce the tendency of the system to self-oscillation when high amplifier and detector sensitivity is used and thus minimise the degree of air damping required to maintain stable operation.

The electrical detector unit 8 comprises a core 20 formed by a short length of soft iron rod secured on one end of the axis rod 7. The core is axially displaceable within a three winding solenoid which is more than twice the length of the core and comprises two identical inner windings 21, 22 disposed side by side and an outer winding 23 which surrounds the two inner windings and is energised by alternating current of 50 c. p. s. The three windings are carried on a former 24 supported in a housing 25 which is carried by a frusto-conical spider 26 secured to the centre ring 3. The two inner windings are connected in opposition so that the induced voltage in them is zero when the core is symmetrically located between them. A displacement of the core to either side produces in the two inner coils a voltage whose amplitude is approximately proportional to the displacement and whose phase is dependent upon the direction of displacement. In the instrument in question the displacement of the diaphragm under a differential pressure of 0.1 inch water gauge is approximately 1 millimetre and in response to this displacement the detector produces a voltage of 0.75 volt. The reaction force on the core of the detector when the displaced 1 millimetre from its central position with the normal loading on the detector output is 0.3 gm.

The moving coil and permanent magnet system used for producing the restoring force is similar to that found in the normal moving coil loudspeaker. The "pot" type magnet 10 is constructed from an annular ring "Ticonal" permanent magnet 10a, the remainder of the magnetic circuit and pole system being made from annealed mild steel. The dimensions of the magnet and air gap are such that a gap flux density of approximately 2000 gauss is produced. The magnet is supported on a frusto-conical spider 27 secured to the centre ring 3. The restoring coil 9 consists of 600 turns of 39 S. W. G. enameled wire wound on a Tufnol former 28 secured on the end of the axis rod 7. The length of the coil is about 1.4 times the length of the air gap in the magnet, which permits an axial movement of the coil in the gap relative to its central position of about $\pm 2$ mm. without appreciable change in the constant relating force on the coil to current through it. The flux density in the air gap and the number of turns on the coil are so designed that a force of approximately 35 grams (corresponding to a differential pressure of 0.1 inch w. g. on an effective diaphragm diameter of 5.3 inches) is developed for a coil current of 30 milliamps. The calibration of the instrument is finally adjusted by a shunt resistance across the coil in order to obtain an exact calibration of 30 milliamps for .1 inch w. g. differential pressure. This calibration constant is chosen to suit available current recorders and the automatic control equipment with which the instrument is to be used.

The diaphragm, axis rod, detector unit, restoring coil and magnet and their supporting parts are enclosed by covers 29 of silk fabric, whose edges are clamped between the casings 4 and the central ring 3. These silk covers protect the moving parts of the instrument against any dust which may enter the casing through the apertures 5. Electrical connections to the coils of the detector unit 8 and to the restoring coil 9 are effected through a seven-pin plug connector 30.

The purpose of the amplifier unit is to convert the small alternating current signal developed in the detector 8 to a direct current of direction and strength suitable for energising the restoring force coil 9. Working on the basis of a maximum diaphragm displacement of 1 mm. which gives rise to an output of 0.75 volt from the detector, it is clear that the amplifier gain must be such as to give a direct current output of approximately 30 milliamps for this value of input signal. Furthermore, the rectification must take account of the phase of the signal developed by the detector since it determines the direction of the displacement of the diaphragm and this must govern the polarity of the current in the restoring coil in order that the balancing force is generated in the appropriate direction.

Figure 2:
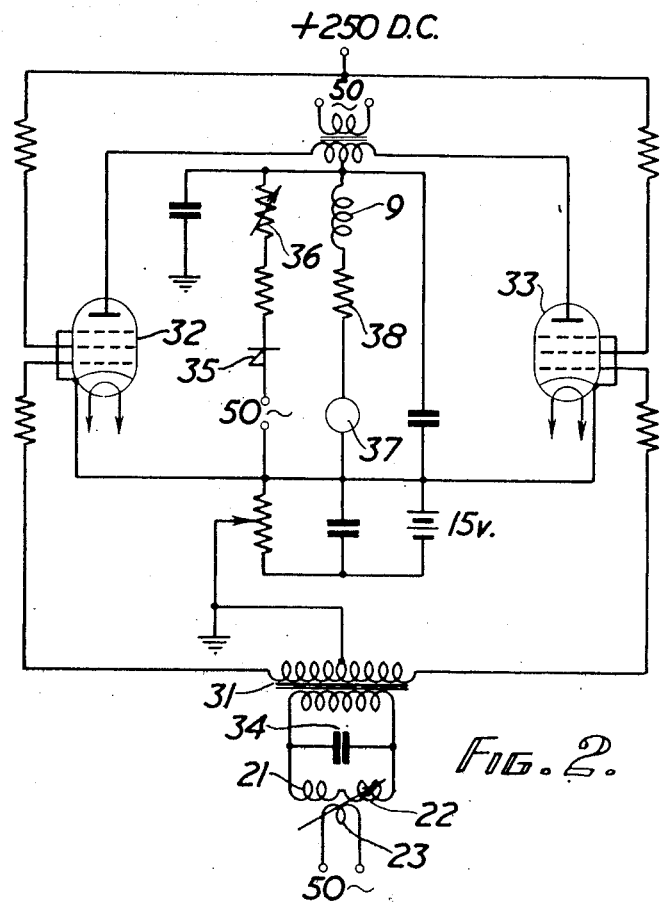
Figure 2 is an electrical circuit diagram of the amplifier unit of the instrument and Figure 3 shows a modification of a part of the device shown in Figure 1.

Referring to the circuit diagram (Figure 2) the detector voltage is applied via step-up transformer 31 to the grids of the power pentodes 32 and 33 whose anodes are fed in anti-phase with the mains alternating current supply voltage. Condenser 34 is introduced to adjust the phase of the grid voltages so that they are in phase or in anti-phase with the anode voltages. An analysis of this circuit will show that the pentodes act as grid controlled full wave rectifiers, the total anode current which is passed through the restoring coil 9 being dependent on the amplitude of the grid voltages. With an input voltage of one phase the valves conduct heavily and as this voltage is reduced to zero and then increased in the opposite phase the total anode current falls to zero. In order that the valves can be operated on the optimum portion of their characteristic while still giving a range of control of the current in the restoring coil from 0 to 30 milliamps a backing-off current is passed through the coil. This current is supplied from an alternating current source via rectifier 35 and control resistance 36. The indicating meters, recorders or operating coil of an automatic controller are connected at 37 in series with the restoring coil 9. The circuit is designed to take account of an automatic controller operating coil resistance of 3,000 ohms and if this is not in use a resistance 38 is included to maintain the total series resistance at the value for which the circuit is designed. Although the instrument is normally required for use on a pressure range 0 to 0.1 inch w. g. and thus the operating range of the current in the restoring coil is 0 to 30 milliamps it is clear that by adjustment of the backing-off current referred to earlier the range can be extended to operate from, say, −0.02 inch w. g. to +0.1 inch w. g., the reverse currents in the coil being provided by the backing-off current. In the design of the amplifier and rectifier circuit consideration has been given to circuit simplicity and reliability of operation. It is pointed out that even in the case of complete failure of one valve the circuit continues to operate, but with reduced efficiency, the only difference being that the effective output current for a given input voltage is halved and half-wave rectification occurs instead of full wave. This only seriously affects the calibration of the instrument in the higher position of the pressure range, namely 0.05 inch w. g. upwards.

Amongst advantages of the instrument described are the following.

The design of the instrument is such that a high degree of stability of calibration and freedom from zero drift can be achieved in the measurement of low differential pressures, while still maintaining a simple mechanical construction in which reasonably large machining tolerances can be allowed without detrimental effect on the instrument performance. This stability of calibration also means that less precautions need be taken to protect the instrument from temperature fluctuations vibration and other disturbances encountered in industrial applications. The principle of operation permits remote indication and recording of the instrument readings in terms of an electrical signal without the restriction of distance or requiring the use of long runs of pressure piping. The instrument has a high speed of response to pressure fluctuations which suits it for use with automatic control equipment. It is pointed out that, since the measuring head can be connected close to the pressure measuring point and the controller or recorder installed at any desired distance from the measuring head, any deterioration in response speed such as is incurred by long runs of pressure piping is avoided. The thermionic amplifier and rectifier unit is of a very simple form and lends itself to robust construction suitable for works use. In any properly designed electronic amplifier the element which tends to reduce the reliability of operation is the thermionic valve because of its indeterminate life and the variability of its parameters with operating voltages and ageing. However, because of the high percentage of feed-back used in this instrument the variability of the valve parameters does not influence the instrument calibration while the indeterminate valve life is effectively taken care of by the fact that the instrument will continue to operate in spite of a valve failure. Failure of one valve during operation can be readily shown by an indicator lamp on the amplifier unit, and valve replacement is one of the simplest and quickest maintenance tasks to carry out.

Figure 3:
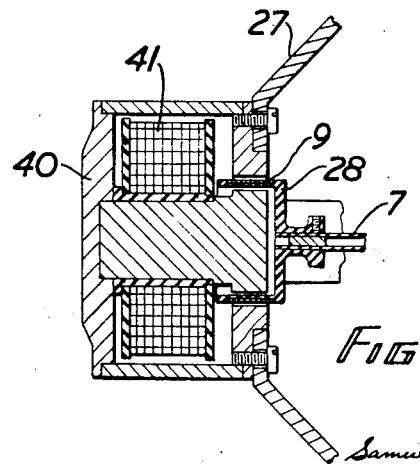

As already indicated, the invention is not limited to the particular arrangement and construction described above, many modifications being possible. If the permanent magnet 10 of the instrument is replaced by an electromagnet which is excited with the same current as that passed through the restoring coil, it will be seen that the force on the coil is proportional to the square of this current, and thus at equilibrium the current in the coil will be proportional to the square root of the pressure applied to the diaphragm. This arrangement is of particular advantage when the instrument is used for measurement of the differential pressure developed across an orifice, as in flow measurement, since, as is well known, the pressure across the orifice is proportional to the square of the flow rate and thus the current read from the instrument will be linearly related to the rate of flow through the orifice. Such an arrangement is illustrated in Figure 3 which shows the permanent magnet 10 of Figure 1 replaced by an electromagnet comprising a built up pot 40 of Swedish iron, radio metal or other suitable material with a low coercive force and an energising coil 41. This energising coil is connected in series with the restoring coil 9, so that it also carries the output current from the amplifier.

We claim:

1. In a device for measuring differential gaseous fluid pressures, the combination comprising, a supporting base having a mounting ring upstanding thereon, a pressure responsive diaphragm extending across the opening in said mounting ring, means for applying said pressures respectively to the opposite faces of said diaphragm, a rigid straight rod secured to the center of said diaphragm, said rod being perpendicular to the plane of said diaphragm and extending in opposite directions therefrom, a spider secured to each face of said mounting ring, a coil support carried by one of said spiders, inductively related annular coil means arranged on said support coaxially with said rod, said coil means including a primary adapted to be connected to a source of alternating current and a secondary, an iron core extending axially outward from one end of said rod, said core being slidable within the central openings in said coils from a neutral position upon axial displacement of said rod to produce in said secondary a voltage output proportional to the rod displacement, magnetic field producing means secured to the other one of said spiders, a restoring coil secured to and arranged coaxially with the opposite end of said rod for movement in said magnetic field, said restoring coil being connected in circuit with said secondary and operable upon energization thereof to establish a counter force acting axially of said rod, said counter force being equal to and serving to balance the force of opposite sense applied axially to said rod by said diaphragm as a result of a change in the differential between the two pressures applied to opposite faces of said diaphragm and current measuring means connected in circuit relation with said restoring coil for measuring the current flowing therein.

2. In a device for measuring differential gaseous fluid pressures, the combination comprising, a supporting base having a mounting ring upstanding thereon, a pressure responsive diaphragm extending across the opening in said mounting ring, means for applying said pressures respectively to the opposite faces of said diaphragm, a rigid straight rod secured to the center of said diaphragm, said rod being perpendicular to the plane of said diaphragm and extending in opposite directions therefrom, a spider secured to each face of said mounting ring, a coil support carried by one of said spiders, a plurality of annular coil means arranged on said support coaxially with said rod, said coil means including a primary coil adapted to be connected to a source of alternating current and a pair of secondary coils connected in opposition, an iron core extending axially outward from one end of said rod, said core being slidable within the central openings in said coils from a neutral position upon axial displacement of said rod to produce a voltage output from said secondary coils proportional to the rod displacement and whose phase is dependent upon the sense of the displacement, magnetic field producing means secured to the other one of said spiders, a restoring coil secured to and arranged coaxially with the opposite end of said rod for movement in said magnetic field, said restoring coil being connected in circuit with said secondary coils and operable upon energization thereof to establish a counter force acting axially of said rod, said counter force being equal to and serving to balance the force of opposite sense applied axially to said rod by said diaphragm as a result of a change in the differential between the two pressures applied to opposite faces of said diaphragm and current measuring means connected in circuit relation with said restoring coil for measuring the current flowing therein.

3. In a device for measuring differential gaseous fluid pressures the combination comprising, a supporting base having a mounting ring upstanding thereon, a half casing attached to each face of said ring, each said casing half being provided with a fluid inlet adapted to be connected respectively to the two sources of fluids whose pressure differential is to be measured, a pressure responsive diaphragm extending across the opening in said mounting ring, a rigid straight rod secured to the center of said diaphragm, said rod being perpendicular to the plane of the diaphragm and extending in opposite directions therefrom, a spider secured to each face of said mounting ring within the associated casing half, a coil support carried by one of said spiders, a plurality of annular coil means arranged on said support coaxially with said rod, said coil means including a primary coil adapted to be connected to a source of alternating current and a pair of secondary coils connected in opposition, an iron core extending axially outward from one end of said rod, said core being slidable axially within the central openings in said coils from a neutral position upon axial displacement of said rod to produce a voltage output from said secondary coils proportional to the rod displacement and whose phase is dependent upon the sense of said displacement, magnetic field producing means secured to the other of said spiders, a restoring coil secured to and arranged coaxially with the opposite end of said rod for movement in said magnetic field, said restoring coil being connected in circuit with said secondary coils and operable upon energization thereof to establish a counter force acting axially of said rod, said counter force being equal to and serving to balance the force of opposite sense applied axially to said rod by said diaphragm as a result of a change in the differential of the two pressures applied to opposite faces of said diaphragm and current measuring means connected in circuit relation with said restoring coil for measuring the current flowing therein.

4. A device for measuring differential fluid pressure as defined in claim 3 and which further includes a damping plate extending across the opening in said mounting ring, said damping plate being disposed between one face of said diaphragm and one of said fluid inlets and including a plurality of apertures therethrough, and adjustable cover means associated with each said aperture for adjusting the degree of the aperture opening to thereby vary the degree of damping.

5. A device for measuring differential fluid pressure as defined in claim 3 and which further includes a fabric cover secured to each face of said mounting ring for excluding extraneous matter entrained with the gaseous fluid admitted to said half casings.

6. In a device for measuring differential gaseous fluid pressures, the combination comprising a gas tight casing, a pressure responsive diaphragm dividing the interior of said casing into two compartments which are hermetically sealed one from the other, said gas tight casing having separate gas inlets therein to each of said compartments for applying said pressures respectively to the opposite faces of said diaphragm, a rigid straight rod secured to the center of said diaphragm, said rod being perpendicular to the plane of said diaphragm and extending in opposite directions therefrom, electric coil means supported on said casing in one of said compartments coaxially with said rod, an iron core extending from one end of said rod, said core being slidable within said coil means upon axial displacement of said rod to produce an output voltage proportional to said displacement, magnetic field producing means supported on said casing in the other of said compartments, a restoring coil secured to and arranged coaxially with the opposite end of said rod for movement in said magnetic field, said restoring coil being connected in circuit with said coil means and operable upon energisation thereof by said output voltage to establish a counter force acting axially of said rod, said counter force being substantially equal to and serving substantially to balance the force of opposite sense applied axially to said rod by said diaphragm as a result of a change in the differential between the two pressures applied to opposite faces of said diaphragm and current measuring means connected in circuit relation with said restoring coil for measuring the current flowing therein.

7. In a device for measuring differential gaseous fluid pressures, the combination comprising, a gas tight casing, a pressure responsive diaphragm extending across the interior of said casing, means for applying said pressures respectively to the opposite faces of said diaphragm, a rigid straight rod secured to the center of said diaphragm, said rod being perpendicular to the plane of said diaphragm and extending in opposite directions therefrom, electric coil means supported on said casing coaxially with said rod an iron core extending from one end of said rod, said core being slidable within said coil means upon axial displacement of said rod to produce an output voltage proportional to said displacement, magnetic field producing means supported on said casing, a restoring coil secured to and arranged coaxially with the opposite end of said rod for movement in said magnetic field, said restoring coil being connected in circuit with said coil means and operable upon energisation thereof by said output voltage to establish a counter force acting axially of said rod, said counter force being substantially equal to and serving substantially to balance the force of opposite sense applied axially to said rod by said diaphragm as a result of a change in the differential between the two pressures applied to opposite faces of said diaphragm and current measuring means connected in circuit relation with said restoring coil for measuring the current flowing therein.

8. A device according to claim 7, in which the magnetic field producing means comprises an electro-magnet, said electro-magnet being energized by the current which passes through said restoring coil.

9. A device according to claim 7, in which said output voltage is alternating and is applied to the input terminals of an amplifier, the resultant output voltage from said amplifier being unidirectional and being applied to said restoring coil for energisation thereof.

10. In a device for measuring differential gaseous fluid pressures, the combination comprising, a gas tight casing, a pressure responsive diaphragm extending across the interior of said casing, means for applying said pressures respectively to the opposite faces of said diaphragm, a rigid straight rod secured to the center of said diaphragm, said rod being perpendicular to the plane of said diaphragm and extending in opposite directions therefrom, a coil support fixed to said casing, inductively related annular coil means arranged on said support coaxially with said rod, said coil means including a primary adapted to be connected to a source of alternating current and a secondary, an iron core extending axially outward from one end of said rod, said core being slidable within the central openings in said coils from a neutral position upon axial displacement of said rod to produce in said secondary a voltage output proportional to the rod displacement, magnetic field producing means secured to the casing and positioned adjacent to the opposite end of said rod, a restoring coil secured to and arranged coaxially with the opposite end of said rod for movement in said magnetic field, said restoring coil being connected in circuit with said secondary and operable upon energisation thereof to establish a counter force acting axially of said rod, said counter force being equal to and serving to balance the force of opposite sense applied axially to said rod by said diaphragm as a result of a change in the differential between the two pressures applied to opposite faces of said diaphragm and current measuring means connected in circuit relation with said restoring coil for measuring the current flowing therein.

SAMUEL SKIPTON CARLISLE.
BERNARD OWEN SMITH.

REFERENCES CITED

The following references are of record in the file of this patent:

UNITED STATES PATENTS

| Number | Name | Date |
|---|---|---|
| 1,568,140 | Edge et al. | Jan. 5, 1926 |
| 1,718,494 | Schurig | June 25, 1929 |
| 2,117,894 | Lenehan | May 17, 1938 |
| 2,360,751 | Ziebolz | Oct. 17, 1944 |
| 2,495,157 | Browne | Jan. 17, 1950 |
| 2,511,752 | Tandler et al. | June 13, 1950 |

FOREIGN PATENTS

| Number | Country | Date |
|---|---|---|
| 653,536 | Great Britain | May 16, 1951 |